Feb. 24, 1948.  R. C. ZEIDLER  2,436,412
FLUID COUPLING
Original Filed April 5, 1941
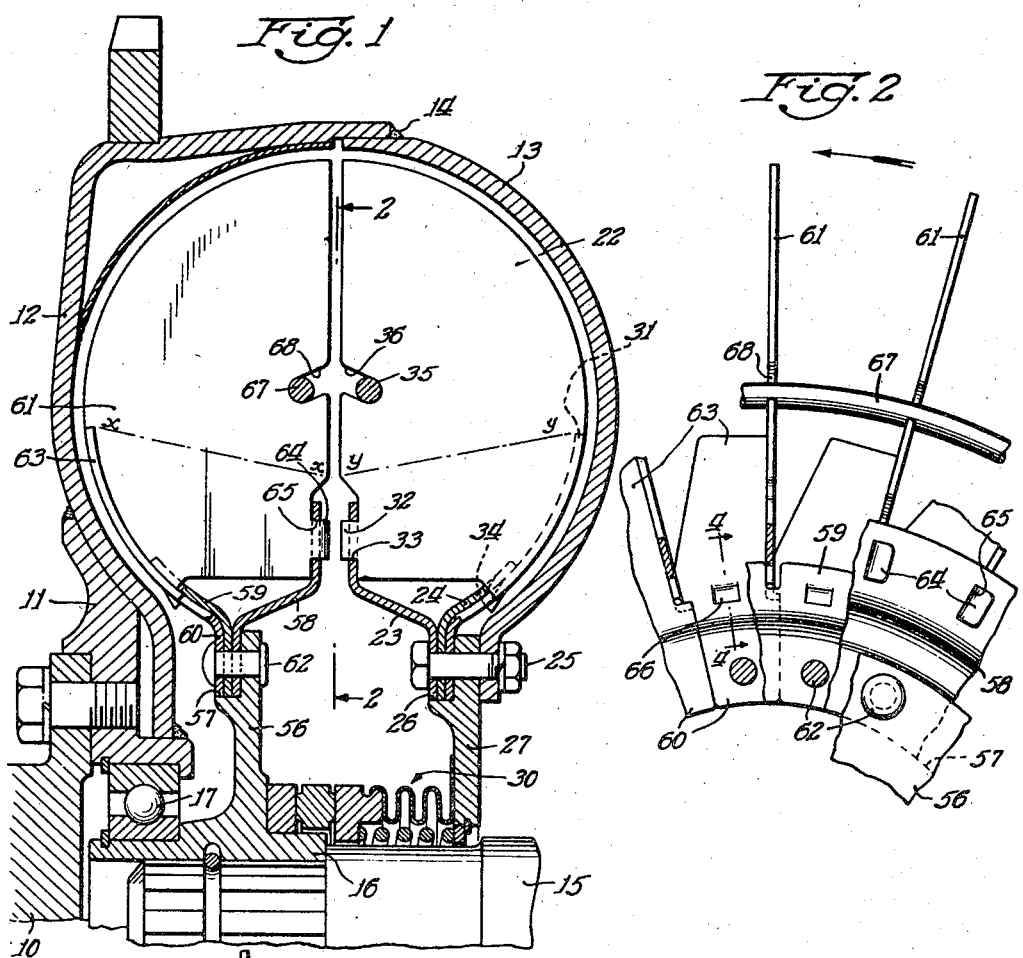
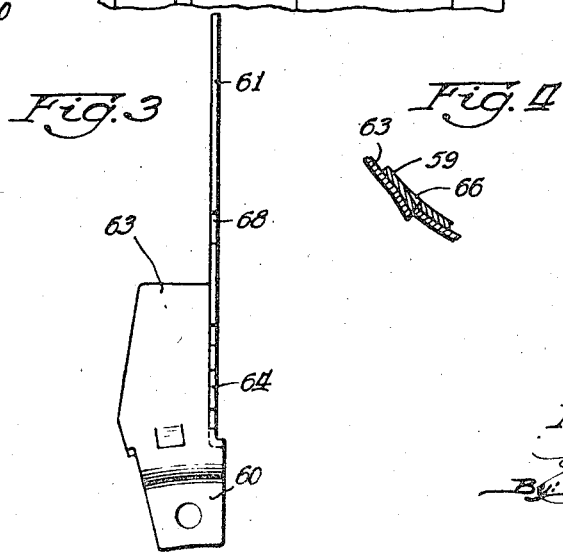
Inventor:
Reinhold C. Zeidler Patented Feb. 24, 1948

2,436,412

UNITED STATES PATENT OFFICE 2,436,412

FLUID COUPLING

Reinhold C. Zeidler, Detroit, Mich., assignor to Borg-Warner Corporation, Chicago, Ill., a corporation of Illinois Original application April 5, 1941, Serial No. 387,019. Divided and this application April 26, 1945, Serial No. 590,349

7 Claims. (Cl. 103—115)

This invention relates to hydraulic couplings of the vaned type. It has specific reference to mounting means for the vanes of this type of coupling, and provision being made for permitting a flexing of the vanes.

The present application is a division of the application of Reinhold C. Zeidler, Serial No. 387,019, filed April 5, 1941, for a "Fluid coupling," which matured in Patent No. 2,378,353, dated June 12, 1945.

The principal object of this invention is to provide an improved fluid coupling which is lighter and less expensive to make, and which inherently effects a mechanical shock absorbing function to eliminate vibration and shocks during low slip conditions.

A specific object of this invention is to provide a fluid coupling wherein the vanes are free of the housing defining the hydraulic circuit so as to be able to move relatively thereto in such region.

Another object of this invention is to provide a coupling having flexible vanes that are effectively mounted on hub members, and also to provide means to insure against the vanes moving rotationally with respect to their mounting means.

Still another object of this invention is to provide simplified mounting devices for the vanes so as to make unnecessary the use of elaborate and expensive special welding equipment. Also to provide, in conjunction with these mounting devices, a novel arrangement for effectively resisting radial centrifugal force in the vanes and yet permit free side-to-side movement resulting from the flexing of the vanes.

Also another object of this invention is to provide mounting devices for the vanes that comprise simple metal stampings with which the vanes are quickly assembled and drivingly connected with the rotatable hub members of the coupling.

These and other objects and features of this invention will become apparent from the following description when taken together with the accompanying drawings having a more or less schematic character, in which:

Fig. 1 is a fragmentary side elevation partly in section of a fluid coupling embodying this invention;

Fig. 2 is a front elevation of the arrangement shown in Fig. 1, the view taken along the plane of line 2—2 on Fig. 1, parts being broken away for clearness;

Fig. 3 is a rear elevation of an edge of a vane; and

Fig. 4 is a fragmentary section through a vane and mounting washer taken along the plane of line 4—4 on Fig. 2.

Referring now to a detailed description of the invention, and particularly to Figs. 1 and 2, 10 is a drive shaft to which is bolted a casting 11 which is welded to a stamped housing 12. A second stamping 13 having the form shown in Fig. 1 is welded to stamping 12 at 14 to form a fluid-tight housing for the fluid coupling. Said housing defines a substantially toroidal container.

A driven shaft 15 extends into the housing formed by stampings 12—13, and supports a hub 16 at the forward or inner end thereof, said hub being splined to the shaft so as to form a driving connection with the latter. Hub 16 is in turn supported from casting 11 by means of a bearing 17. The outer periphery of the hub has a flange member 56 formed with a shoulder 57 which centers a pair of diverging disks or washers 58 and 59, as well as an attaching sector 60 of a vane 61. A rivet 62 secures all three of these elements to hub member or flange 56.

The vane 61 to be used with the above supporting means is formed with an integral marginal flange 63 extending preferably less than half its curved edge. This flange serves to stiffen the inner portion of the vane so that its outer region beyond broken line $x$—$x$ is flexible. The flange also guides the fluid around that portion of its circuit. The disk or washer 59 and the inward portion of the flange 63 are preferably counterparts and conform in shape, as seen in Fig. 1 so that the washer overlies the adjacent portion of the flange and has a surface contact therewith of substantial area.

At its inner straight edge, vane 61 is provided with tabs 64 which are received in slots 65 in the disk 58. To provide additional support for the vanes, disk or washer 59 is sheared through the vane at 66 as shown in Fig. 4 to insure the vane against moving rotationally with respect to the other disk or washer 58. It will be observed that if rivet 62 should loosen and if no such support were provided, the vane might tend to rotate around a line passing through the rivet and tab 64.

Still further support may be supplied by means of a wire hoop 67 which may be slipped into a notch 68 located near the center of the toroidal circuits. The purpose of the hoop is to provide a further means of resisting the radial centrifugal force in the vanes and yet permit free side-to-side movement resulting from the flexing of the vanes. The hoop is made of wire having high tensile strength butt-welded at its ends to form a hoop of definite diameter. In assembling the coupling, the hoop is pressed into a circular groove in a fixture into which the vanes are subsequently assembled while the riveting or welding is being done at the inner ends. The vane assembly is then forced out of the fixture to allow the hoop to contract thereby creating a slight radially inward preload on all of the vanes.

The part of disk or washer 58 extending into the hydraulic circuit may serve as a baffle to prevent the formation of shallow high velocity vortex circuits during high slip periods. The unsupported and unattached radially outer region of the vane permits a certain amount of flexing to occur in the vanes 61. No other support is provided for the vane and particularly no semi-toroidal shell is attached to the vanes as is customary in previous designs.

The driving vanes 22 may be duplicates of driven vanes 61 and may be similarly held in the diverging disks or washers 23, 24, secured by bolts 25 on the shouldered portion 26 of a hub member 27, the latter being of annular form and secured to the radially inner portion of the housing stamping 13 by said bolts 25. This annular hub member 27 serves as an abutment member for a bellows type seal 30 which is inserted between said hub 27 and the other hub 16.

By reason of the arrangement herein before defined the driving and driven members of the hydraulic torque transmitting device each has a hub assembly comprising the respective hubs and the outwardly diverging washers which receive and mount the inner portions of the driving and driven vanes, and said vanes are attached to said washers by the specially designed means herein before described in detail.

The vanes 22 have the lateral stiffening flanges 31 at their inner portions and there are tabs 32 that are received in slots 33 in disk or washer 23. The other disk or washer 24 is sheared through the vanes 22 at 34 in the same manner as before described with respect to the vanes 61, and the wire loop 35 is slipped into notches 36 near the center of the toroidal circuits to resist radial centrifugal force on said vanes. The flexing of these vanes 22 takes place in the outer regions of said vanes beyond the plane y—y as in the vanes 61.

The construction hereinbefore described possesses a number of advantages which improve both the efficiency and the operating characteristics of the coupling. By making both the driving and driven vanes entirely free of the housing in the working circuit and permitting the vanes to flex outside the working circuit, a vibration dampening effect is secured. This effect is available when the coupling is installed in a motor vehicle and the car is coasting against the engine as well as when the engine is driving. The elimination of a separate shell for the driven vanes increases the diameter of the permissible hydraulic working circuit without increasing the outside diameter of the housing. This results in a greater capacity for a given-sized coupling. The elimination of the driven vane shell practically eliminates axial thrust on the driven hub and simplifies the bearing construction. Furthermore, the absence of a shell eliminates the problem of returning to the circuit fluid, which may have escaped to the outside of the shell, into the reservoir commonly used for this purpose.

It is understood that the foregoing description is the preferred embodiment of the invention disclosed herein and that the scope of the invention is not to be limited thereto but is to be determined by the appended claims.

I claim:

1. In a hydraulic torque transmitting device a rotary element having a plurality of vanes drivingly associated therewith; a radial flange on said rotary element; a hub member supporting said vanes, said hub member comprising diverging washers drivingly connected to said flange, at least one of said washers having slots; tabs on said vanes cooperating with said slots to form the driving connection between said vanes and rotary element; and lateral flanges on said vanes anchored to the other of said washers, said lateral flanges serving to stiffen the radially inner regions of said vanes and also to guide the fluid around the proximate portion of its circuit.

2. In a hydraulic torque transmitting device a housing of toroidal section; a rotary element in said housing having a plurality of vanes drivingly associated therewith; a radial flange on said rotary element; a hub member for supporting said vanes, said hub member comprising diverging washers drivingly connected to said flange, at least one of said washers being slotted, and said vanes having portions received between said washers and cooperating with the slots to effect the driving connection between the vanes and rotary element, said vanes having other portions overlying the other of said washers and anchored thereto.

3. A hydraulic torque transmitting device as defined in claim 2 wherein the overlying portions of the vane flange and washer are of counterpart shape in cross-section to effect a surface contact therebetween of substantial area.

4. In a hydraulic torque transmitting device a housing of toroidal section; a rotary element in said housing having a plurality of vanes drivingly associated therewith; a radial flange on said rotary element; a hub member for supporting said vanes, said hub member comprising diverging washers drivingly connected to said flange, at least one of said washers being slotted, and said vanes having portions received between said washers, tabs on one of the margins of said vanes entered in the slots, and lateral flanges on other margins of said vanes, said flanges overlying the other of said washers and anchored thereto, said tabs and flanges effecting the driving connection between said rotary element and said vanes.

5. In a hydraulic torque transmitting device a housing of toroidal section; a rotary element in said housing having a plurality of vanes drivingly associated therewith; a radial flange on said rotary element; a hub member for supporting said vanes, said hub member comprising diverging washers drivingly connected to said flange, at least one of said washers being slotted, and said vanes having portions received between said washers and cooperating with the slots to effect the driving connection between the vanes and rotary element; and laterally disposed marginal flanges on said vanes cooperating with the other of said washers serving to guide the fluid around the proximate portion of its circuit, the said other washer being sheared through said flanges for anchoring said vanes.

6. In a hydraulic torque transmitting device having a housing of toroidal section, a rotary element in said housing having a plurality of vanes drivingly associated therewith, in combination with a radial flange on said rotary element, and a hub member for supporting said vanes, said hub member comprising diverging washers drivingly connected to said flange, at least one of said washers being slotted, and said vanes having means cooperating with the slots to effect the driving connection between the vanes and rotary element, said vanes having other means adapted to overlie the other of said washers and anchored thereto.

7. In a hydraulic torque transmitting device having a housing of toroidal section, a rotary element in said housing, a plurality of vanes drivingly associated with said rotary element, in combination with a radial flange on said rotary element, a hub member for supporting said vanes, said hub member comprising diverging washers drivingly associated with said flange, at least one of said washers having slots, and said vanes having portions adapted to be received between said washers and adapted to cooperate with the slots to effect the driving connection between the vanes and the rotary element, and radially disposed marginal flanges on said vanes cooperating with the other of said washers and adapted to serve as a guide for the fluid around the proximate portion of its circuit, the said other washer being sheared through said flanges for anchoring said vanes.

REINHOLD C. ZEIDLER.

REFERENCES CITED

The following references are of record in the file of this patent:

UNITED STATES PATENTS

| Number | Name | Date |
| --- | --- | --- |
| 289,436 | Moran | Dec. 4, 1883 |
| 1,698,327 | Doran | Jan. 8, 1929 |
| 2,328,393 | Neracher et al. | Aug. 31, 1943 |

FOREIGN PATENTS

| Number | Country | Date |
| --- | --- | --- |
| 16,666 | Great Britain | July 28, 1904 |